(No Model.)

G. WESTINGHOUSE, Jr.
AIR BRAKE STRAINER ATTACHMENT.

No. 245,109. Patented Aug. 2, 1881.

Witnesses
R. H. Whittlesey
E. L. Parker

Inventor George Westinghouse Jr.
By Attorney George H. Christy

UNITED STATES PATENT OFFICE.

GEORGE WESTINGHOUSE, JR., OF PITTSBURG, PENNSYLVANIA.

AIR-BRAKE-STRAINER ATTACHMENT.

SPECIFICATION forming part of Letters Patent No. 245,109, dated August 2, 1881.

Application filed June 15, 1881. (No model.)

*To all whom it may concern:*

Be it known that I, GEORGE WESTINGHOUSE, Jr., of Pittsburg, county of Allegheny, State of Pennsylvania, have invented or discovered a new and useful Improvement in Air-Brake-Strainer Attachments; and I do hereby declare the following to be a full, clear, concise, and exact description thereof, reference being had to the accompanying drawings, making a part of this specification, in which—like letters indicating like parts—

Figure 1:
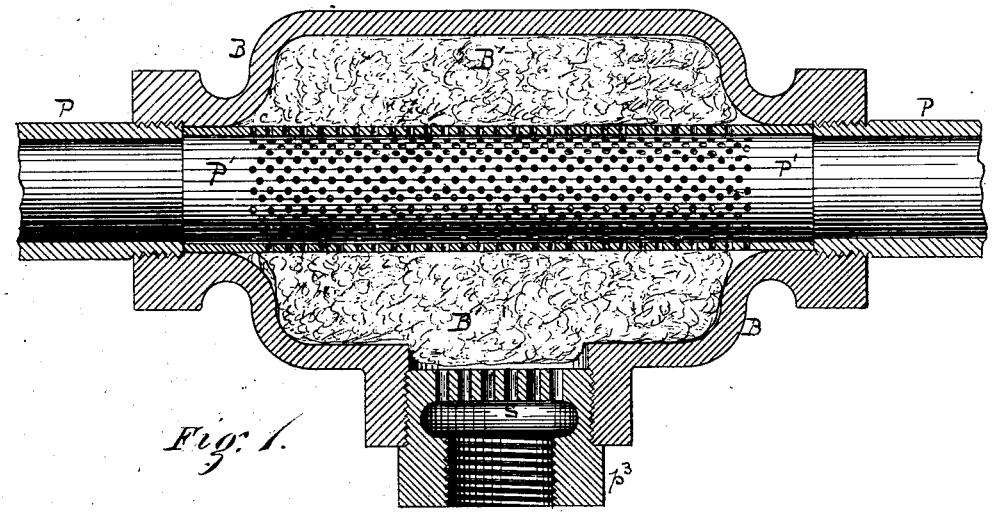
Figure 2:
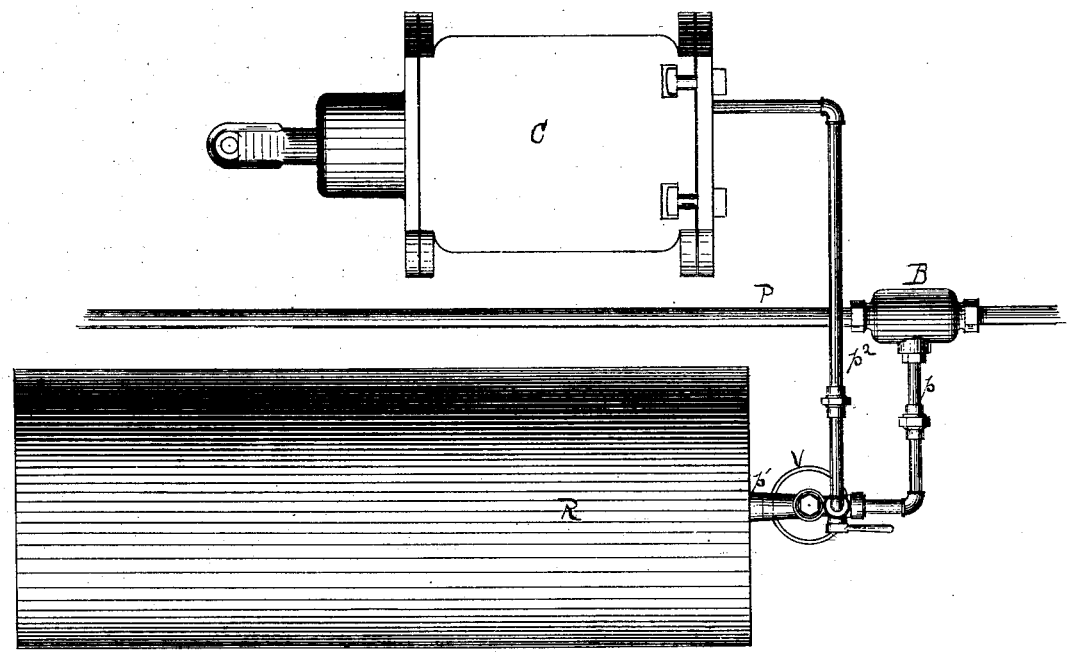

Figure 1 is a sectional view of the strainer device which I employ in connection with my air-brake apparatus; and Fig. 2 is a top or plan view, to a reduced scale, of so much of the air-brake apparatus as is necessary to illustrate the present invention.

In the operation of railway air-brake apparatus of the class to which the "Westinghouse automatic" belongs the air employed in actuating the brakes is usually passed through an automatic-valve appliance, commonly known in the Westinghouse apparatus as the "triple valve." In fitting up such apparatus it sometimes happens that dust, dirt, iron filings, or chips will become lodged in some parts of the pipe, so that when the compressed air is turned on such dust, &c., is liable to be blown or carried by the current of air into such automatic valve and lodge there, so as to interfere with its proper working. To prevent this, as well as keep dust and dirt from entering such automatic valve at any time, I arrange an air-strainer at any desired point in the line of air communication from the compressing apparatus to such valve, and by preference, one at or near each such valve—say at the junction of the branch pipe which leads from the main air-pipe underneath each car to the automatic valve belonging to the brake apparatus of that car—so that all dust, dirt, &c., which may have lodged or accumulated in the main pipe will be excluded from the valvular apparatus referred to.

For convenience of illustration I have shown in Fig. 2 the Westinghouse air-cylinder C, auxiliary reservoir R, triple valve V, and their more important connections, wherein P represents a portion of the main air-conduit or brake-pipe which passes back throughout the train. $p$ is a branch which leads to a side port in the triple-valve case. $p'$ is a pipe leading from another port in the triple-valve case to the auxiliary reservoir R, and the pipe $p^2$ leads from a third triple-valve port to the brake-cylinder C. The three ports thus referred to are, in their relationship to the triple valve, as well as to the pipes named, clearly indicated in United States Patent No. 220,556, granted to me October 14, 1879, by the letters P, R, and C, respectively, as therein used. Now, to prevent dust, dirt, &c., from entering the triple valve, I arrange, say at B, a strainer device, one suitable form of which is represented by full-sized sectional view in Fig. 1, where P P represent portions of the main pipe and $p^3$ a thimble into which to screw the end of the branch $p$. Instead of using an ordinary T for making this junction or pipe-union I make a chambered T, as represented at B, and between the ends of the main pipes P, I insert in such a chamber a perforated tube or pipe-section P'. The chamber B', surrounding the pipe-section P', I fill with sponge, as shown, or other porous substance not liable to pack, and such as will readily catch dust or prevent the passage of obstructions from P to the triple valve.

The perforations in the pipe-section P' may be in any desired number, and each of any required size, such as will permit of the passage in a sufficiently short time of the desired amount of air for the purposes in view.

To keep the sponge or other packing from working into the pipe $p$, I use a thimble, $p^3$, the head or diaphragm $s$ of which has a series of holes or perforations, of number and size as may be desired.

While I have thus explained what I believe to be the best construction of strainer, I do not limit myself thereto in the combination in which I use it, as other suitable known air-strainer may be employed with the other parts of the combination and give a like operation and a like result.

I claim herein as my invention—

1. In combination with the reservoir, brake-cylinder, and automatic valve of an automatic air-brake apparatus, an air-strainer and dust-absorbent, arranged in the line of air communication between the compressor and the automatic valve, substantially as set forth.

2. The air-strainer B, adapted to be inserted in the line of pipe-communication of an air-brake apparatus, and having a perforated pipe-section P', a surrounding chamber B', and a side port leading to the automatic valve, substantially as set forth.

3. The strainer B, having, in combination, the perforated section P', a surrounding chamber, B', filled with porous material, and a perforated diaphragm, s, in the side port, substantially as set forth.

In testimony whereof I have hereunto set my hand.

GEO. WESTINGHOUSE, Jr.

Witnesses:
R. H. WHITTLESEY,
GEORGE H. CHRISTY.